United States Patent

Shoemaker

[15] 3,659,924
[45] May 2, 1972

[54] FOUR MEMBER 100X MICROSCOPE OBJECTIVE

[72] Inventor: Arthur H. Shoemaker, Erie, N.Y.

[73] Assignee: American Optical Corporation, Southbridge, Mass.

[22] Filed: Mar. 18, 1971

[21] Appl. No.: 125,623

[52] U.S. Cl. .................. 350/224, 350/175 ML, 350/176, 350/177

[51] Int. Cl. ........................................... G02b 21/02

[58] Field of Search .................... 350/224, 176, 177, 175 ML

[56] References Cited

UNITED STATES PATENTS 3,514,189   5/1970   Aklin ............................. 350/177 X
3,537,772  11/1970   Shoemaker ..................... 350/176

*Primary Examiner*—John K. Corbin
*Attorney*—William C. Nealon, Noble S. Williams, Robert J. Bird and Bernard L. Sweeney

[57] ABSTRACT

A four member achromatic oil immersion microscope objective having a numerical aperture of substantially 1.25 and a magnification of substantially 100X.

2 Claims, 1 Drawing Figure

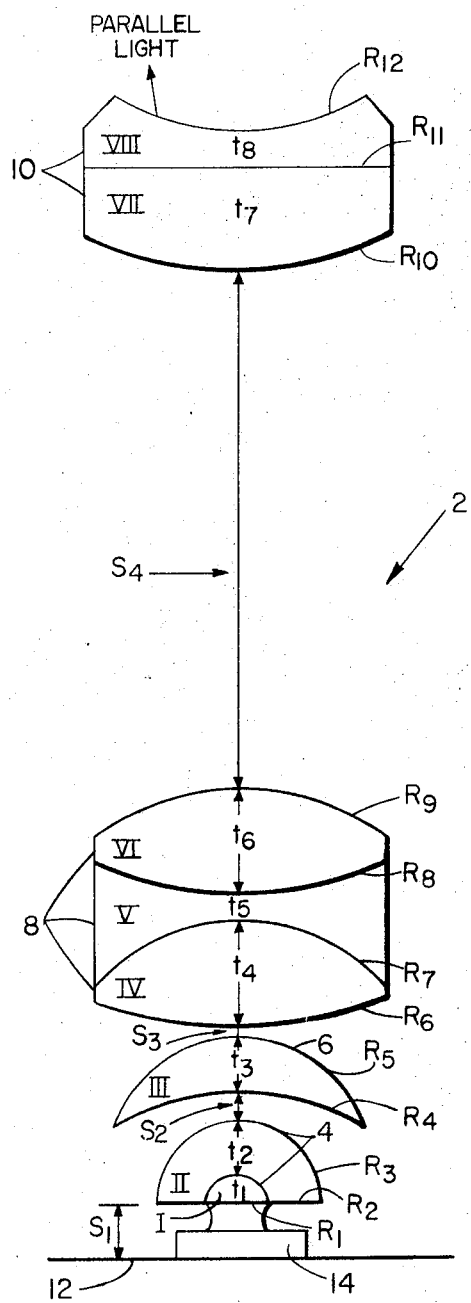

FOUR MEMBER 100X MICROSCOPE OBJECTIVE

BACKGROUND OF THE INVENTION

This invention relates to improvements in a microscope objective, and in particular to an achromatic oil immersion microscope objective with a numerical aperture of substantially 1.25 and a magnification of substantially 100X. It is the object of the present invention to provide such a microscope objective which is well corrected for the usual chromatic image aberrations as well as spherical aberration, coma, and astigmatism, while having a substantially flat image field when used with a telescope objective as described for example in U.S. Pat. No. 3,437,398.

DRAWING

In the drawing, microscope objective is represented by a plurality of lenses viewed transversely to their axes.

DESCRIPTION

Referring now to the drawing, a microscope objective is generally shown at 2. It includes a front doublet 4, a single lens 6, a triplet 8, and a doublet 10, all of said lenses in axial alignment. Objective 2 is shown disposed relative to an objective plane 12 supporting a specimen 14, (exaggerated scale) with immersion oil in the space between the specimen 14 and the first lens element.

Doublet 4 includes a plano-convex lens I and a concavo-convex lens II. Lens 6 is a concavo-convex positive meniscus shaped lens also designated as III. Triplet 8 includes a double-convex lens IV, a double concave lens V, and a double convex lens VI together forming a positive double convex triplet. Doublet 10 includes a convex-plano lens VII and a plano-concave lens VIII, together forming a convex-concave negative doublet.

The lens parameters are as follows: The successive lens radii are designated $R_1 - R_{12}$, where a minus sign indicates radii on centers of curvature lying on the object of side of their vertices. The axial thickness of successive lens elements are designated $T_1 - T_8$. The successive axial spaces from the object plane 12 are designated $S_1 - S_4$. The refractive indices of the successive lens elements are designated $ND_1 - ND_8$. The Abbe numbers of the successive lens glasses are designated $\gamma_1 - \gamma_8$.

The above mentioned parameters are related to the focal length according to the following constructional data. The ND and Abbe numbers are pure numbers and the other parameters are in units of millimeters.

MAGNIFICATION = 100X N.A. = 1.25

| Lens | Radius R | Thickness T | Space S | Refractive Index ND | Abbe Number $\nu$ |
|---|---|---|---|---|---|
| | | | $S_1 = .1740F$ | | |
| I | $R_1 = $ Plano | $T_1 = .2736F$ | | $ND_1 = 1.51700$ | $\nu_1 = 64.54$ |
| | $R_2 = -.6779F$ | | | | |
| II | $R_3 = -.8596F$ | $T_2 = .8207F$ | | $ND_2 = 1.88050$ | $\nu_2 = 41.01$ |
| | | | $S_2 = .0109F$ | | |
| III | $R_4 = -6.5328F$ | $T_3 = 1.5254F$ | | $ND_3 = 1.88050$ | $\nu_3 = 41.01$ |
| | $R_5 = -2.6667F$ | | | | |
| | | | $S_3 = .1641F$ | | |
| IV | $R_6 = 7.3623F$ | $T_4 = 1.8165F$ | | $ND_4 = 1.78833$ | $\nu_4 = 50.47$ |
| V | $R_7 = -2.2979F$ | $T_5 = .6566F$ | | $ND_5 = 1.80491$ | $\nu_5 = 25.42$ |
| | $R_8 = 2.7335F$ | | | | |
| VI | $R_9 = -11.9566F$ | $T_6 = 1.7946F$ | | $ND_6 = 1.48651$ | $\nu_6 = 84.46$ |
| | | | $S_4 = 6.9705F$ | | |
| VII | $R_{10} = 3.9941F$ | $T_7 = 1.6852F$ | | $ND_7 = 1.80784$ | $\nu_7 = 40.74$ |
| VIII | $R_{11} = $ Plano | $T_8 = .6566F$ | | $ND_8 = 1.61710$ | $\nu_8 = 53.90$ |
| | $R_{12} = 2.4982F$ | | | | |

The foregoing parameters of radius, thickness, and space are based on the value of F. The value of F in this case, as an example, is 1.8277. At this focal length, the absolute values of the foregoing data is as follows:

F = 1.8277 MAGNIFICATION = 100X N.A. = 1.25

| Lens | Radius R | Thickness T | Space S | Refractive Index ND | Abbe Number $\nu$ |
|---|---|---|---|---|---|
| | | | $S_1 = .318$ | | |
| I | $R_1 = $ Plano | $T_1 = .500$ | | $ND_1 = 1.51700$ | $\nu_1 = 64.54$ |
| | $-R_2 = 1.239$ | | | | |
| II | $-R_3 = 1.571$ | $T_2 = 1.500$ | | $ND_2 = 1.88050$ | $\nu_2 = 41.01$ |
| | | | $S_2 = .020$ | | |
| III | $-R_4 = 11.940$ | $T_3 = 2.788$ | | $ND_3 = 1.88050$ | $\nu_3 = 41.01$ |
| | $-R_5 = 4.874$ | | | | |
| | | | $S_3 = .300$ | | |
| IV | $R_6 = 13.456$ | $T_4 = 3.320$ | | $ND_4 = 1.78833$ | $\nu_4 = 50.47$ |
| V | $-R_7 = 4.200$ | $T_5 = 1.200$ | | $ND_5 = 1.80491$ | $\nu_5 = 25.42$ |
| | $R_8 = 4.996$ | | | | |
| VI | $-R_9 = 21.853$ | $T_6 = 3.280$ | | $ND_6 = 1.48651$ | $\nu_6 = 84.46$ |
| | | | $S_4 = 12.740$ | | |
| VII | $R_{10} = 7.300$ | $T_7 = 3.080$ | | $ND_7 = 1.80784$ | $\nu_7 = 40.74$ |
| VIII | $R_{11} = $ Plano | $T_8 = 1.200$ | | $ND_8 = 1.61710$ | $\nu_8 = 53.90$ |
| | $R_{12} = 4.566$ | | | | |

What is claimed is:
1. An achromatic microscope objective having a magnification of substantially 100X and a numerical aperture of substantially 1.25 for forming an image of an object plane, said image being well corrected for chromatic aberrations, coma, astigmatism, and curvature of image field, said objective comprising:
   a front plano-convex lens member I;
   a second concavo-convex lens member II;
   said front and second members forming a doublet;
   a third concavo-convex lens member III;
   a fourth double convex lens member IV;
   a fifth double concave lens member V;
   a sixth double convex lens member VI;
   said fourth, fifth and sixth members forming a triplet;
   a seventh convex-plano lens member VII;
   an eighth plano-concave lens member VIII;
   said seventh and eighth members forming a doublet;
   all of said lens members being axially aligned;
   the parameters of lens radii (R1 - R12), lens thicknesses (T1 - T8), axial spaces among lens elements and object plane (S1 - S4), refractive indices (ND1 - ND9) and Abbe numbers ($\gamma 1 - \gamma 9$), being determined by the following relationship wherein all radii, thicknesses, and spaces are in millimeters:

2. An achromatic microscope objective having a magnification of substantially 100X and a numerical aperture of substantially 1.25 for forming an image of an object plane, said image being well corrected for chromatic aberrations, coma, astigmatism, and curvature of image field, said objective comprising:
   a front plano-convex lens member I;
   a second concavo-convex lens member II;
   said front and second members forming a doublet;
   a third concavo-convex lens member III;
   a fourth double convex lens member IV;
   a fifth double concave lens member V;
   a sixth double convex lens member VI;
   said fourth, fifth and sixth members forming a triplet;
   a seventh convex-plano lens member VII;
   an eighth plano-concave lens member VIII;
   said seventh and eighth members forming a doublet;
   all of said lens members being axially aligned;
   the parameters of lens radii (R1 - R12), lens thicknesses (T1 - T8), axial spaces among lens elements and object plane (S1 - S4), refractive indices (ND1 - ND9) and Abbe numbers ($\gamma 1 - \gamma 9$), being determined by the following relationship wherein all radii, thicknesses, and spaces are in millimeters:

MAGNIFICATION=100X N.A.=1.25

| Lens | Radius R | Thickness T | Space S | Refractive Index ND | Abbe Number $\nu$ |
|---|---|---|---|---|---|
| I | $R_1$=Plano | $T_1$=.2736F | $S_1$=.1740F | ND1=1.51700 | $\nu 1$=64.5 |
| | $R_2$=−.6779F | | | | |
| II | $R_3$=−.8596F | $T_2$=.8207F | | ND2=1.88050 | $\nu 2$=41.0 |
| III | $R_4$=−6.5328F | $T_3$=1.5254F | $S_2$=.0109F | ND3=1.88050 | $\nu 3$=41.0 |
| | $R_5$=−2.6667F | | | | |
| IV | $R_6$=7.3623F | $T_4$=1.8165F | $S_3$=.1641F | ND4=1.78833 | $\nu 4$=50.4 |
| V | $R_7$=−2.2979F | $T_5$=.6566F | | ND5=1.80491 | $\nu 5$=25.4 |
| | $R_8$=2.7335F | | | | |
| VI | $R_9$=−11.9566F | $T_6$=1.7946F | $S_4$=6.9705F | ND6=1.48651 | $\nu 6$=84.4 |
| VII | $R_{10}$=3.9941F | $T_7$=1.6852F | | ND7=1.80784 | $\nu 7$=40.7 |
| | $R_{11}$=Plano | | | | |
| VIII | $R_{12}$=2.4982F | $T_8$=.6566F | | ND8=1.61710 | $\nu 8$=53.9 |

F=1.8277 MAGNIFICATION=100X N.A.=1.25

| Lens | Radius R | Thickness T | Space S | Refractive Index ND | Abbe Number $\nu$ |
|---|---|---|---|---|---|
| I | $R_1$=Plano | $T_1$=.500 | $S_1$=.318 | ND1=1.51700 | $\nu 1$=64.54 |
| | $R_2$=1.239 | | | | |
| II | $R_3$=1.571 | $T_2$=1.500 | | ND2=1.88050 | $\nu 2$=41.01 |
| III | $R_4$=11.940 | $T_3$=2.788 | $S_2$=.020 | ND3=1.88050 | $\nu 3$=41.01 |
| | $R_5$=4.874 | | | | |
| IV | $R_6$=13.456 | $T_4$=3.320 | $S_3$=.300 | ND4=1.78833 | $\nu 4$=50.47 |
| V | $R_7$=4.200 | $T_5$=1.200 | | ND5=1.80491 | $\nu 5$=25.42 |
| | $R_8$=4.996 | | | | |
| VI | $R_9$=21.853 | $T_6$=3.280 | $S_4$=12.740 | ND6=1.48651 | $\nu 6$=84.46 |
| VII | $R_{10}$=7.300 | $T_7$=3.080 | | ND7=1.80784 | $\nu 7$=40.74 |
| | $R_{11}$=Plano | | | | |
| VIII | $R_{12}$=4.566 | $T_8$=1.200 | | ND8=1.61710 | $\nu 8$=53.90 |

* * * * *